United States Patent
Hofers et al.

(10) Patent No.: US 7,175,225 B2
(45) Date of Patent: Feb. 13, 2007

(54) MOTOR VEHICLE WITH A CONVERTIBLE ROOF

(75) Inventors: Thorsten Hofers, Bramsche (DE); Joachim Vedder, Osnabruck (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 10/531,827

(22) PCT Filed: Oct. 17, 2003

(86) PCT No.: PCT/DE03/03441

§ 371 (c)(1),
(2), (4) Date: Oct. 7, 2005

(87) PCT Pub. No.: WO2004/037582

PCT Pub. Date: May 6, 2004

(65) Prior Publication Data

US 2006/0119130 A1    Jun. 8, 2006

(30) Foreign Application Priority Data

Oct. 18, 2002    (DE) ................ 102 48 759

(51) Int. Cl.
    *B60J 7/12*    (2006.01)
(52) U.S. Cl. .................. 296/107.01; 296/107.09; 296/117
(58) Field of Classification Search .......... 296/107.01, 296/107.09, 117, 121, 122
See application file for complete search history.

(56) References Cited

U.S. PATENT DOCUMENTS

| 5,167,296 | A | | 12/1992 | Schreier et al. |
| 5,772,274 | A | * | 6/1998 | Tokarz ................ 296/107.09 |
| 6,150,781 | A | * | 11/2000 | Hollerbach ............. 318/283 |
| 6,246,199 | B1 | * | 6/2001 | Porter et al. ............ 318/466 |
| 6,253,602 | B1 | | 7/2001 | Uchida |
| 6,273,492 | B1 | * | 8/2001 | Schroder et al. ....... 296/107.01 |
| 6,347,828 | B1 | * | 2/2002 | Rapin et al. .......... 296/107.17 |
| 6,431,636 | B1 | * | 8/2002 | Schutt ................. 296/107.18 |
| 6,863,334 | B2 | * | 3/2005 | Dangl et al. .......... 296/107.09 |
| 6,866,323 | B2 | * | 3/2005 | Guillez et al. ......... 296/107.17 |
| 6,921,122 | B2 | * | 7/2005 | Obendiek et al. ...... 296/107.07 |
| 7,093,884 | B2 | * | 8/2006 | Eichhorst et al. ........... 296/105 |
| 7,104,587 | B2 | * | 9/2006 | MacNee et al. ........... 296/121 |
| 2004/0051343 | A1 | * | 3/2004 | Grubbs ................... 296/116 |

FOREIGN PATENT DOCUMENTS

| DE | 40 20 351 A1 | 1/1992 |
| DE | 198 45 820 A1 | 4/2000 |
| DE | 100 09 692 A1 | 2/2001 |
| DE | 100 39 978 A1 | 5/2001 |
| EP | 0 550 952 A1 | 7/1993 |
| EP | 1 180 443 A1 | 2/2002 |

* cited by examiner

*Primary Examiner*—D. Glenn Dayoan
*Assistant Examiner*—Greg Blankenship
(74) *Attorney, Agent, or Firm*—Gifford, Krass, Groh, Sprinkle, Anderson & Citkowski, P.C.

(57) ABSTRACT

A motor vehicle with a movable convertible top includes a control device for controlling a convertible top motion and a device for the recognition of the convertible top position. The device for convertible top position recognition continuously monitors the position of the convertible top. The position of a defined element of the convertible top is determined by means of at least one acceleration sensor that measures the current acceleration in relationship to the acceleration of free fall.

3 Claims, 2 Drawing Sheets

MOTOR VEHICLE WITH A CONVERTIBLE ROOF

FIELD OF THE INVENTION

The invention relates to a motor vehicle with a movable convertible top and a device for the recognition of the convertible top position.

BACKGROUND OF THE INVENTION

Convertibles are often equipped with a movable convertible top, which can be automatically moved for example from an open to a closed position or vice versa with the press of a button. The movement of the convertible top is usually effected by a hydraulic drive, which in turn drives a convertible top mechanism, which includes a convertible top linkage. The convertible top linkage may be a carrying device for a textile roof as well as a so-called hard-top folding roof with mainly rigid roof elements, and may include a cover for a convertible top compartment as well as all elements that are being moved in the process. To control the movement of the convertible top it is necessary to obtain information on the current position of the convertible top.

German Patent Application DE19842337A1 describes an operating mechanism for a folding top of a convertible vehicle, comprising a hydraulic gear with a hydraulic pump and hydraulic motors that are linked to the foldable top, whereby the operating mechanism comprises a position transmitter for generating electric signals according to positions of the folding top and control electronics for creating the planned movement of the convertible top and for sensing the electric signals of the position transmitter. Limit switches are positioned at the ends of the range of motion of the convertible top as well as within the range of motion of the convertible top; they are used to sense the convertible top position. The limit switches transmit a signal to the control electronics as soon as the convertible top has reached the final position switch. In the process, a constant rotational speed or a constant power output of the electric motor that drives the hydraulic pump is allocated to each area between the two final position switches.

The limit switches are used as terminal points for position recognition. To determine the position of the convertible top between these terminal points it is suggested to integrate the rotational speed of the motor over time and to interpolate the convertible top position. To avoid a high quantity of limit switches, the DE19842337A1 application proposes to calculate the approximate position of the convertible top with the help of the control equipment using the number of revolutions of the electric motor and the average displacer volume of the hydraulic pump.

However, the disadvantage of using this method is that only the theoretical, mathematically calculated information on the convertible top position is available between the terminal points with limit switches. The information does no longer corresponds to the actual convertible top position for example after a change in speed of the convertible top movement. Moreover, the disadvantage of this solution is that a number of end switches have to be provided in the range of motion of the convertible top to enhance the accuracy of the information in regard to the current convertible top position and that this involves an accordingly higher amount of expense.

According to the DE19842337A1, also sensors for sensing the positioning angle or travel distance of the convertible top linkage may be used in order to accurately calculate the current position of the convertible top, whereby the sensors create an analog signal or they scan and count marks on the linkage like a potentiometer for example.

However, these types of sensors that are designed as potentiometers and are used to continuously scan the displacement have to be directly attached to the pivot point of the convertible top section that is to be scanned, whereby it is problematic that the cumbersome size of the potentiometer, because of its physical properties, can not fall below a certain limit. As a result, there is the danger of collision between the sensors and other convertible top segments when these types of sensors are being used.

Moreover, this type of sensor that is designed as a potentiometer is a manual part, which is subject to wear when it is used, and to a drift in temperatures, which can lead to errors in regard to the information on the current convertible top position.

It is also known from practical applications that the convertible top position can be calculated with the aid of the measurement of the retraction travel of the cylinders of a hydraulic system of the convertible top drive. However, it has to be taken into account with this method, that this type of solution requires a comparably large installation space and does not provide any information on the position of the convertible top inherently, but merely on the distance of cylinder travel. Therefore, a possibly defective connection point, that is, a disruption of the connection between a cylinder and the convertible top linkage, cannot be detected.

The fact that the currently known installations for the recognition of convertible top positions are highly prone to errors is disadvantageous in particular in regard to the detection of an obstruction situation, since possible problems during the sequence of the convertible top motion, such as a decelerated motion or the blocking of the convertible top, which can be indications that an object or a body part is caught in the convertible top mechanism, may not be detected or not detected until very late.

SUMMARY OF THE INVENTION

It is the object of the present invention to provide a motor vehicle with an automatically movable convertible top, which is equipped with a device for the recognition of a convertible top position, which provides reliable information on the actual position of the convertible top.

In accordance with the invention, this object is solved with a motor vehicle that comprises a movable convertible top according to the features of described herein.

The advantage of the solution in accordance with the invention is that the continuous monitoring of the convertible top position and an accurate position recognition of the convertible top are possible at any time, whereby at least one acceleration sensor, which measures the actual acceleration in relationship to the acceleration of free fall, is used to calculate the position of a defined convertible top element.

With the aid of these types of acceleration sensors that are also called G-sensors, which sense two axes in one plane, the longitudinal acceleration and the lateral acceleration, it is possible to determine the longitudinal inclination, and the transversal inclination of the convertible top. The angle to the surface of the earth can be resolved to approximately 0.2 degree with the aid of a very high possible resolution of the acceleration.

In addition to the high accuracy in the recognition of the convertible top position, the use of G-sensors offers the additional advantage of high freedom in the design of their disposition, since this type of convertible top position recognition can be implemented independently from convertible top kinematics.

Furthermore, these types of acceleration sensors offer the advantage that they can also be used for other functionalities in the vehicle, such as for roll-over detection.

Of particular advantage is the device for convertible top position recognition according to the invention that operates with high accuracy when it interacts with a detection device that recognizes an interference into the range of motion of the convertible top mechanism, which can for instance feature a sensor system with sensors that carry out measurements based on different measurement principles, whereby the convertible top movement is controlled in a safety mode after a fault has been detected in the detection equipment or after an obstruction situation has been recognized.

The provision of information on the exact current convertible top position permits a reaction that is geared toward the particular operating situation. The reaction can consist of continuing the convertible top motion with reduced speed or stopping or reversing the convertible top motion.

Additional advantages and advantageous features of the invention will be readily understood after reading the description, the drawings, and the patent claims.

The drawings show schematically an example of the invention, which will be explained in further detail in the following description.

DETAILED DESCRIPTION OF THE INVENTION

Figure 1:
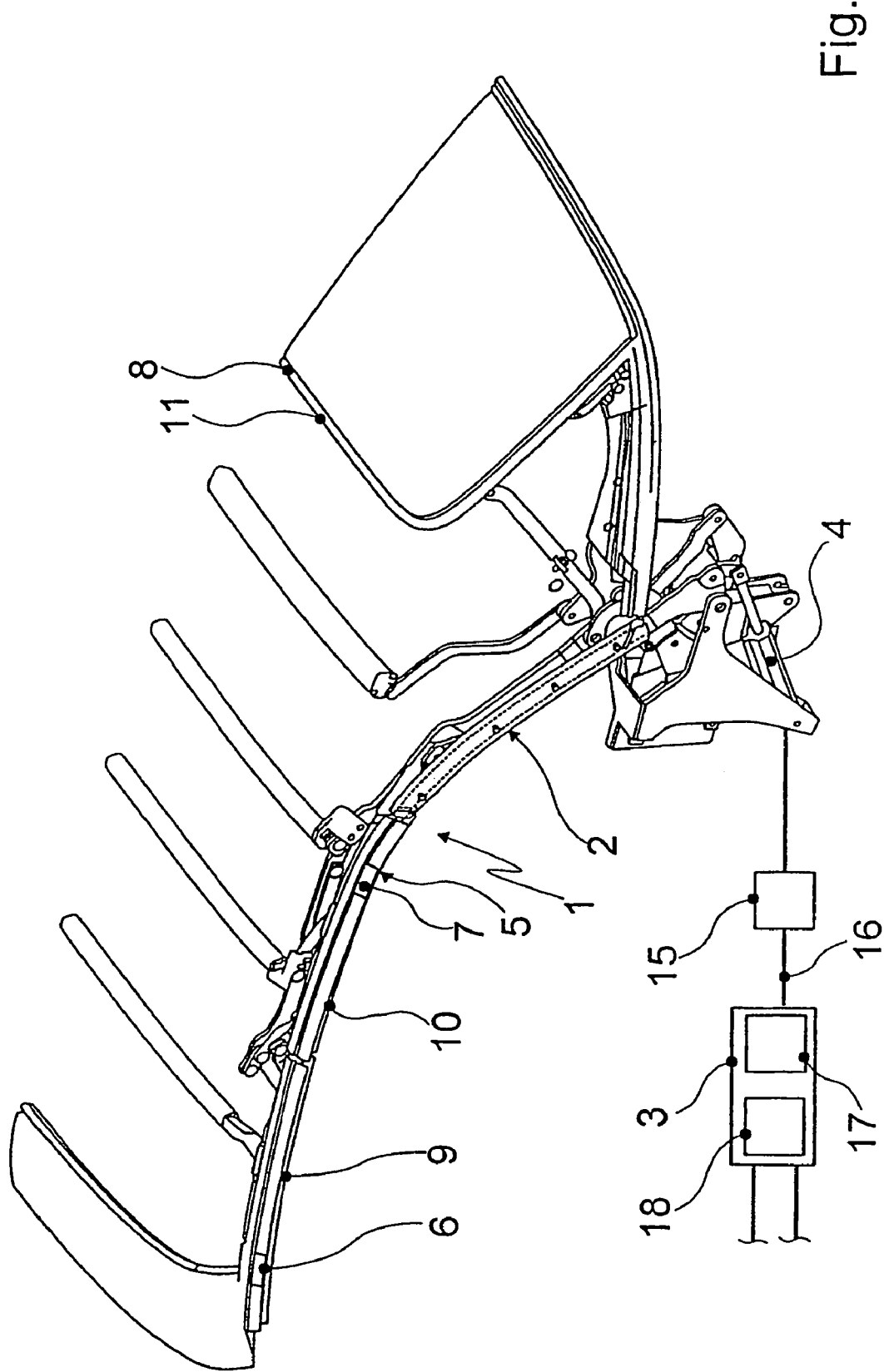
FIG. 1 is a schematic perspective view of a movable convertible top of a convertible vehicle with a device for the recognition of the convertible top position according to the invention, whereby the convertible top that is shown individually is closed.

FIG. 1 shows only a movable convertible top 1 of a convertible vehicle, which includes a convertible top mechanism 2 that may be covered with a textile roof, whereby the convertible top mechanism can be moved between an open and a closed position by means of a control device 3 representing a convertible top control unit and an electrohydraulic convertible top drive 4, of which only sections are shown in FIG. 1.

The control device 3 is designed so as to interact with a rain sensor and a key transmitter, and to start an automatic convertible top motion upon the request of the driver with the aid of a button in the vehicle or through the key transmitter, as well as when precipitation is recognized by the rain sensor.

A device 5 for the recognition of the convertible top position is provided in order to recognize the current position of the convertible top 1 or its convertible top mechanism 2. The device 5 is equipped with several acceleration sensors 6, 7, 8. In the embodiment according to FIG. 1, a first acceleration sensor 6 is located on a front linkage section 9, adjacent to a vehicle window; a second acceleration sensor 7 is located on a linkage section 10 which is located centrally in regard to the vehicle length and adjacent to a vehicle window, and a third acceleration sensor 8 is located on a rear window frame 11.

Figure 2:
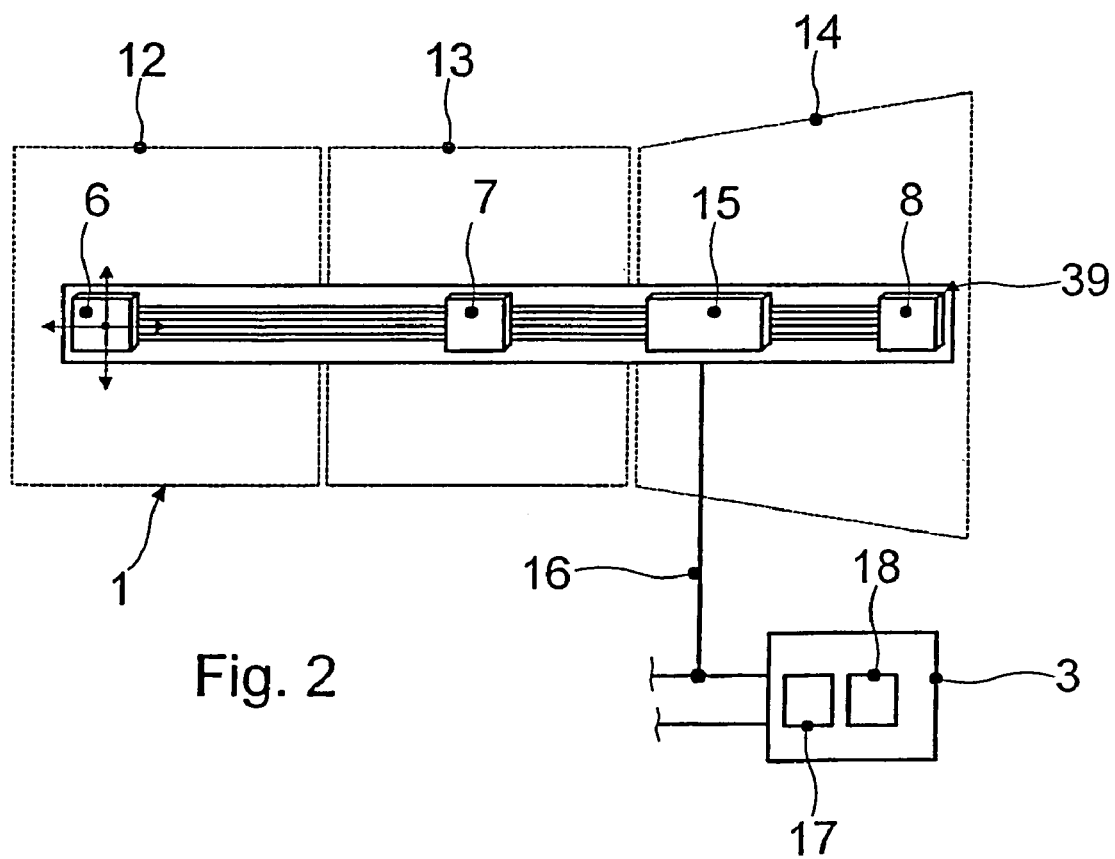
FIG. 2 is a schematic top view of another convertible top of a convertible vehicle with the device for convertible top position recognition according to FIG. 1.

Only three acceleration sensors are shown in the drawings both in FIG. 1 and in FIG. 2; however, any number of acceleration sensors can be used depending on the application. The location of the acceleration sensors 6, 7, 8 in FIGS. 1 and 2 is only to be regarded as an example and can be changed depending on the type of convertible top design.

FIG. 2 shows an application of the device 5 for the recognition of the convertible top position for a convertible top 1', which is designed as a hard top folding roof, and for which the acceleration sensors 6, 7, 8 are located on different roof segments, such as the first acceleration sensor 6 on a front roof segment 12, the second acceleration sensor 7 on a center roof segment 13, and the third acceleration sensor 8 on a rear roof segment 14.

The acceleration sensors 6, 7, 8 can be positioned anywhere on convertible top 1 or 1', whereby attention is to pay only to the orientation in a defined co-ordinate system.

The acceleration sensors 6, 7, 8 represent so-called G-sensors, which measure and show the current acceleration in relationship to the acceleration of fall or normal g force. The earth's acceleration of free fall of 9.81 m/s$^2$ corresponds to 1 G (G=gravitation). The acceleration sensors 6, 7, 8 not only measure the acceleration of the element to which each of them is attached, but also the incline in relationship to the earth's surface. The acceleration sensors 6, 7, 8 that are used here operate in a range of 0 G up to a maximum of 10 G and provide an output voltage, which is linear to the acceleration value.

As appears from FIG. 2 in particular, the acceleration sensors 6, 7, 8 on the convertible top 1 or 1' are connected via a suitable wiring harness or a highly-flexible microstrip to an electronic analysis unit 15, which analyzes the sensor signals and calculates a relative position using the individual positions. The calculated relative position of the acceleration sensors 6, 7, 8 or the components that carry them is transmitted to the convertible top control unit 3 by an electronic analysis unit 15 via a bus system such as a CAN bus 16.

In the embodiment described here, a further acceleration sensor 17 that is designed as a G-sensor is located in the convertible top control unit 3; the sensor determines the location or incline of the motor vehicle in the defined co-ordinate system, to which the acceleration sensors 6, 7, 8 are allocated as well. The convertible top control unit 3 uses the relative position and the present information on the vehicle incline to calculate the current position of the convertible top 1 or 1'.

The current convertible top position is also transmitted to an electronic analysis unit of an automatic detection device 18, which recognizes an intervention into the range of motion of the convertible top mechanism 2, and which is here integrated into the convertible top control unit 3 in regard to its electronic analysis unit, and which is only shown schematically in FIGS. 1 and 2. The detection device 18, which may comprise for instance a sensor system with optical and/or capacitive sensors, can recognize an obstruction situation with high accuracy since it knows the current convertible top position, whereupon the convertible top control unit 3 can initiate an adequate reaction.

Advantageously, the typical convertible top final position switches are no longer required when the device 5 for convertible top position recognition according to the invention is used, since a corresponding pulse is put out by the acceleration sensors 6, 7, 8, when the convertible top 1 or 1' has reached a limit stop, in other words when it is fully closed or open, whereby the sensors are subject to powerful negative acceleration.

Moreover, with the present continuous convertible top position recognition it is possible to implement an adaptive self-learning control of the convertible top motion, which may be realized for instance by manually driving to individual defined convertible top positions one time.

The invention claimed is:

1. A motor vehicle with a movable convertible top having top elements, comprising:
   a control device for controlling motion of the convertible top; and
   a top position recognition device operable to continuously monitor the position of the top, the device including at least one acceleration sensor mounted to a top element that measures the current acceleration in relationship to the acceleration of free fall.

2. A motor vehicle according to claim 1, wherein several acceleration sensors are located on the top elements and connected to an electronic analysis unit, which uses the signals of the acceleration sensors to calculate a relative position, which, in conjunction with the present information on the vehicle incline, results in the current convertible top position.

3. A motor vehicle according to claim 1, wherein the control device for controlling the convertible top motion comprises a further acceleration sensor that is used to detect the vehicle's inclination.

* * * * *

UNITED STATES PATENT AND TRADEMARK OFFICE
CERTIFICATE OF CORRECTION

| | | |
|---|---|---|
| PATENT NO. | : 7,175,225 B2 | Page 1 of 1 |
| APPLICATION NO. | : 10/531827 | |
| DATED | : February 13, 2007 | |
| INVENTOR(S) | : Thorsten Hofers et al. | |

It is certified that error appears in the above-identified patent and that said Letters Patent is hereby corrected as shown below:

Column 1, Line 4, Missing: REFERENCE TO RELATED APPLICATION

This application is a U.S. National Phase filing under 35 U.S.C. §371 of Patent Cooperation Treaty No. PCT/DE2003/003441, filed October 17, 2003, which claims priority to German Patent Application No. 10248759.6, filed October 18, 2002, the entire content of all of which are incorporated herein by reference.

Column 1, Line 57, replace "corresponds to" with --correspond to--

Column 1, Line 65, replace "DE19842337A1, also sensors" with --DE19842337A1 application, sensors--

Column 2, Line 51, replace "features of described" with --features described--

Column 4, Line 19, replace "is to pay" with --is paid--

Signed and Sealed this

Eighteenth Day of December, 2007

JON W. DUDAS
*Director of the United States Patent and Trademark Office*